United States Patent
Lingala et al.

(10) Patent No.: US 12,456,152 B2
(45) Date of Patent: Oct. 28, 2025

(54) METHODS AND SYSTEMS TO DETERMINE A SERVICE TIME FOR PROVIDING A SERVICE

(71) Applicant: HONEYWELL INTERNATIONAL INC., Charlotte, NC (US)

(72) Inventors: Ramesh Lingala, Telangana (IN); Suresh Raman, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 37 days.

(21) Appl. No.: 17/252,651

(22) PCT Filed: Jul. 22, 2020

(86) PCT No.: PCT/IB2020/056867
§ 371 (c)(1),
(2) Date: Dec. 15, 2020

(87) PCT Pub. No.: WO2021/028746
PCT Pub. Date: Feb. 18, 2021

(65) Prior Publication Data
US 2022/0180457 A1    Jun. 9, 2022

(30) Foreign Application Priority Data
Aug. 14, 2019    (IN) .............................. 201911032937

(51) Int. Cl.
G06Q 50/12        (2012.01)
G06Q 10/0631      (2023.01)
G07C 9/00         (2020.01)

(52) U.S. Cl.
CPC ....... *G06Q 50/12* (2013.01); *G06Q 10/06312* (2013.01); *G07C 9/00904* (2013.01)

(58) Field of Classification Search
CPC .... G06Q 10/00; G06Q 10/06; G06Q 10/0635; H04L 63/0407; H04L 63/0823;
(Continued)

(56) References Cited

U.S. PATENT DOCUMENTS 10,304,273 B2    5/2019    Johnson et al.
10,586,410 B2    3/2020    Wang et al.
(Continued)

FOREIGN PATENT DOCUMENTS

CN    108510627 A    9/2018
CN    108765668 A    11/2018
(Continued)

OTHER PUBLICATIONS

P. Kansakar, et al. "Technology in the Hospitality Industry: Prospects and Challenges," in IEEE Consumer Electronics Magazine, vol. 8, No. 3, pp. 60-65, May 2019, doi: 10.1109/MCE.2019.2892245 <https://ieeexplore.ieee.org/document/8684803?source=IQplus> (Year: 2019).*

(Continued)

*Primary Examiner* — Jerry O'Connor
*Assistant Examiner* — Michael R Koester
(74) *Attorney, Agent, or Firm* — Seager, Tufte & Wickhem, LLP (57) ABSTRACT

Aspects of the invention are directed towards a system and a method for determining a service time for providing a service to a room based on an availability of a user in the room. One or more embodiments of the invention describe the method comprising steps of receiving audits associated with a lock of a room. One or more embodiments of the invention further describe determining if a user of the room has opted for a user privacy service and analyzing the audits if the user has opted for the user privacy service. Furthermore, the embodiments of the invention also describe deter- (Continued)

mining an availability of the user in the room based on analysis of the audits and determining a service time for providing a service to the room based on the availability of the user in the room.

16 Claims, 4 Drawing Sheets

(58) Field of Classification Search
CPC .... G06F 21/32; G06F 21/577; G06F 21/6245; G06F 21/316; G16H 10/60
See application file for complete search history.

(56) References Cited

U.S. PATENT DOCUMENTS

| | | |
|---|---|---|
| 10,706,649 B2 | 7/2020 | Kuenzi et al. |
| 2015/0278739 A1 | 10/2015 | Parker et al. |
| 2017/0011570 A1* | 1/2017 | Johnson ............. G07C 9/00571 |
| 2017/0115018 A1* | 4/2017 | Mintz .................... G05B 15/02 |
| 2017/0116561 A1* | 4/2017 | Saddler .................. G06Q 50/12 |
| 2018/0218460 A1* | 8/2018 | Boss ....................... G06N 5/022 |
| 2018/0248704 A1 | 8/2018 | Coode et al. |
| 2020/0349786 A1 | 11/2020 | Ho et al. |

FOREIGN PATENT DOCUMENTS

| | | | |
|---|---|---|---|
| EP | 3731193 A1 * | 10/2020 | |
| WO | WO-2007087683 A1 * | 8/2007 | ............. G06Q 10/02 |
| WO | WO-2014112939 A1 * | 7/2014 | ......... G06Q 10/0631 |
| WO | WO-2016131243 A1 * | 8/2016 | ............... G07C 9/00 |

OTHER PUBLICATIONS

Translation of WO-2016131243-A1 (Year: 2016).*
International Search Report for International Application No. PCT/IB2020/056867; Application Filing Date: Jul. 22, 2020; Date of Mailing: Sep. 25, 2020; 3 pages.
Written Opinion for International Application No. PCT/IB2020/056867; Application Filing Date: Jul. 22, 2020; Date of Mailing: Sep. 25, 2020; 6 pages.

* cited by examiner

METHODS AND SYSTEMS TO DETERMINE A SERVICE TIME FOR PROVIDING A SERVICE

CROSS-REFERENCE TO RELATED APPLICATIONS

This application is a National Stage Application of PCT/IB2020/056867, filed Jul. 22, 2020, which claims the benefit of India Application No. 201911032937, filed Aug. 14, 2019, the disclosures of which are incorporated herein by reference in their entirety.

TECHNICAL FIELD OF INVENTION

The present invention relates generally to intelligent room services management. More particularly, the invention relates to a system and method for determining a service time for providing service/s to a room based on an availability of a guest.

BACKGROUND OF THE INVENTION

Currently, room service in a commercial building like a hotel need to be scheduled every day. Janitors or room service providers provide the room service to a room of a hotel as per scheduled time period. The time period to provide the room service generally depends upon the time when guest of the room leaves or arrives in the room or may also depend on the request of the guest of the hotel.

There is a potential threat to the privacy of the guest when the room service is scheduled when the guest is in the room. Also, there might be a situation when the room service cannot be provided at a fixed period of time which causes inconvenience to the guest. In such situations, the guest of the room may not feel comfortable and gets disturbed when the room service is provided in the presence of the guest. This may create a bad impression on the guest of the room and as a result, the guest may not prefer the hotel for his/her next visit.

Currently, there does not exist any solution which automatically determines the guest availability in the room. Also, there is no solution which can automatically predict or determine a service time for providing room services in the room based on the availability of the guest in the room.

In view of afore-mentioned problems, in the existing solutions of room services' management, there is a need of efficient and effective system and method for providing intelligent room services management. There is also a need for determining the best service time for providing service to the room. There is also a requirement for automatically determining/predicting an availability of the guest in the room. In order to solve the problems in the existing solutions of room services management, system and method is disclosed for determining service time for providing a service to a room based on availability time of a user in the room.

SUMMARY OF THE INVENTION

Various embodiments of the invention describe a method for determining a service time for providing a service to a room. The method comprises steps of receiving audits associated with a lock of a room and determining if a user of the room has opted for a user privacy service. The method further comprises steps of analyzing the audits if the user has opted for the user privacy service and determining an availability of the user in the room based on the analysis of the audits. Accordingly, a service time is determined for providing a service to the room based on the availability time of the user in the room.

In an embodiment of the invention, the audits represent data associated with entering and leaving the room, a room type information, and/or a status information of the lock.

In another embodiment of the invention, the analysis of the audits is performed by applying a machine learning technique to the audits.

In yet another embodiment of the invention, the machine learning technique examines the audits, a stay period information of the user and/or a stay history of the user to determine the service time for providing the service to the room.

In still another embodiment of the invention, the machine learning technique is applied to the audits when a predetermined number of audits are available for analysis.

In another embodiment of the invention, the service is provided to the room if the user is not available in the room.

In yet another embodiment of the invention, the service time is notified to a service provider for providing the service to the room based on the analysis.

In still another embodiment of the invention, credentials are transmitted to the service provider for accessing the room after determining the service time to service the room.

In another embodiment of the invention, the service time is determined based on privileges provided to the user.

In yet another different embodiment of the invention, the service is provided to the room at a regular service time if the user of the room has not opted for the user privacy service.

In a different embodiment of the invention, a system is disclosed for determining a service time for providing a service to a room. The system comprises a lock associated with a room and a server. The lock comprises an audit generator unit adapted to generate audits and a communication module adapted to transmit the audits to a server. The server comprises a communication unit adapted to receive the audits from the lock, a processor adapted to determine if a user of the room has opted for a user privacy service and an analysis unit. The analysis unit of the server is adapted to analyze the audits if the user has opted for the user privacy service and determine an availability of the user in the room based on the analysis of the audits. The analysis unit may be adapted to determine a service time for providing a service to the room based on the availability time of the user in the room.

In another embodiment of the invention, the audits represent data associated with entering and leaving the room, a room type information, and/or a status information of the lock.

In yet another embodiment of the invention, the analysis of the audits is performed by applying a machine learning technique to the audits.

In still another embodiment of the invention, the machine learning technique examines the audits, a stay period information of the user and/or a stay history of the user to determine the service time for providing the service to the room.

In another embodiment of the invention, the service is provided to the room at a regular service time if the user of the room has not opted for the user privacy service.

In yet another embodiment of the invention, the service time is notified to a service provider for providing the service to the room based on the analysis.

In still another embodiment of the invention, the service time is determined based on privileges provided to the user.

In another embodiment of the invention, the server transmits credentials to the service provider for accessing the room after determining the service time to service the room.

In yet another embodiment of the invention, the server applies the machine learning technique to the audits when a predetermined number of audits are available for analysis.

In another different embodiment of the invention, a computer readable medium is disclosed for determining a service time for providing a service to a room. The computer readable medium comprises one or more processors and a memory coupled to the one or more processors. The memory storing instructions which are executed by the one or more processors. The one or more processors are configured to receive audits associated with a lock of a room and are configured to determine if a user of the room has opted for a user privacy service. The one or more processors are further configured to analyze the audits if the user has opted for the user privacy service and determine an availability of the user in the room based on the analysis of the audits. Accordingly, a service time is determined for providing a service to the room based on the availability time of the user in the room.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is the technology with a system and a method for determining a service time for providing a service to a room based on an availability of a user in the room. Further, the service time is determined after receiving audits associated with a lock of a room and if a user of the room has opted for a user privacy service. And, the user privacy service may be a service opted by the user to maintain privacy in the room.

As used herein, the service can be any service that is provided by a service provider in a room and may include, but is not limited to, a room cleaning, a laundry, a housekeeping, a room management and/or any such service/s provided by a janitor, an agent, a hotel staff or a nursing staff.

As used herein, the user may be a person or a guest of the room. The user may book the room in a hotel for a certain period of time using an application.

As used herein, the audits are associated with the lock of the room. Also, the audits may be generated by the lock when the guest/user of the room opens or closes the lock of the room. The audits may be a data associated with entering or leaving of the room by the guest, a room type information and/or status information of the lock. The audits may be used to predict a time duration for which the guest will be inside or outside the room.

As used herein, the lock may be an accessing/latching device and may be installed on the door of the room. The lock may be connected to a server through a wired or wireless network. Further, the lock may comprise, but is not limited to, an audit generation unit, a communication module, a status detector, a processor, and/or memory. Further, the lock may be operated by the user to open or close the door of the room. Moreover, the lock may be a smart lock, an electronic lock, an electro-mechanical lock, a mechanical lock or any accessing device that is understood by a person skilled in the art.

As used herein, the server has one or more processing capabilities and may also communicate with the lock or an electronic device through network. Such server may be a cloud storage, a remote database, or any such storage known in the art.

As used herein, the network may refer to a Global System for Mobile (GSM) network, a room management network, Long-Term Evolution (LTE) network, and a code-division multiple access (CDMA) network, a narrow-band internet of thing (NB-IoT) technique or category M1 technique or any such network/technique that is known in the art.

Throughout the specification, reference numeral 108 depicts a single network. The reference numerals 108A, 108B . . . 108N may be considered as one or more networks.

Figure 1:
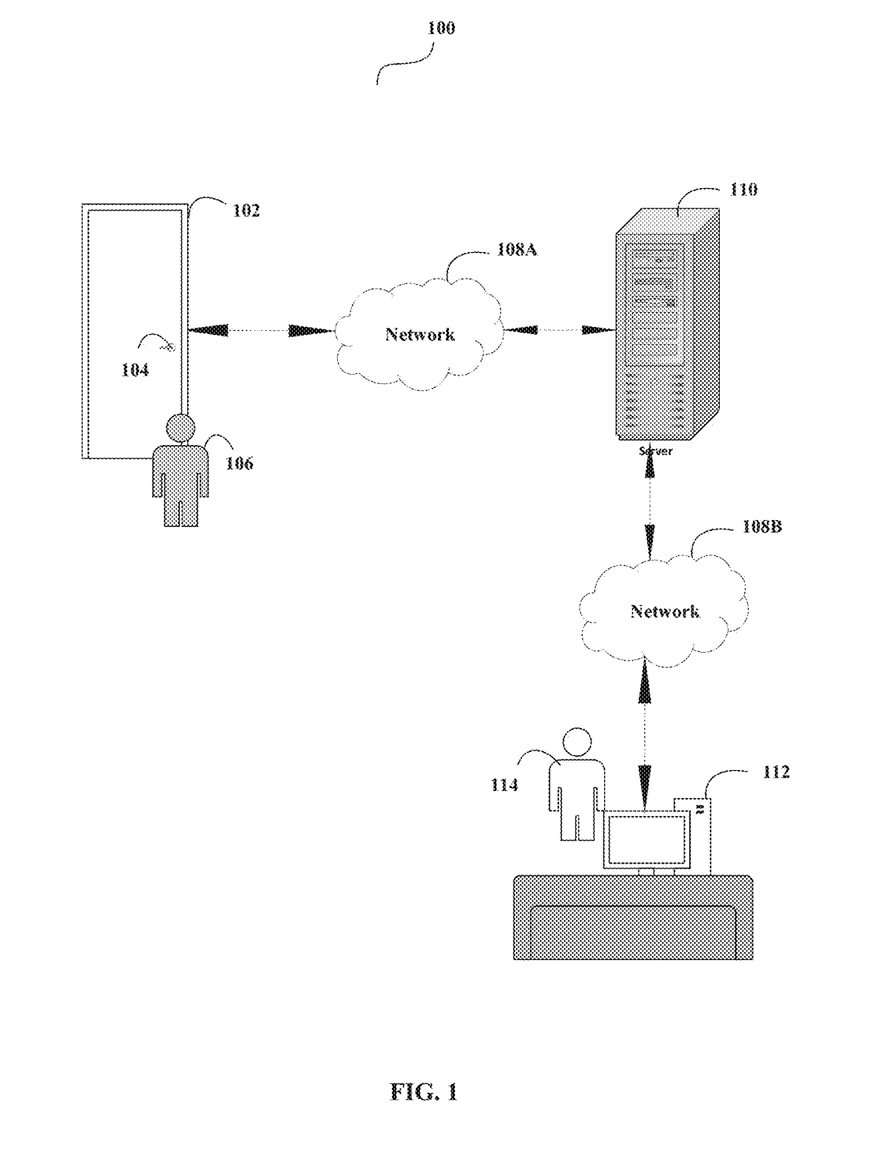
FIG. 1 depicts an exemplary system architecture according to an exemplary embodiment of the invention.

FIG. 1 depicts a system architecture 100 for determining a service time for providing a service to a room based on an availability of a user 106 in the room 102 according to an exemplary embodiment of the invention. As depicted in FIG. 1, a lock 104 may be installed on a door of a room 102, a user 106 of the room 102, a server 110 coupled to a network 108A/108B, a service provider 114 associated with an electronic device 112. The lock 104 of the room 102 may communicate with the server 110 through the network 108A The server 110 may also communicate with the electronic device 112 through the network 108B. As used herein, the electronic device 112 may be a desktop computer or a hand held device such as a mobile phone with a communication module, an interface, a processor, a memory and with network connectivity. Example of the user equipment includes a desktop, workstation PC, a laptop, a smart phone, a tablet, a wearable device and the like.

The user 106 of the room 102 may operate the lock 104 by opening or closing the lock 104 of the room 102. The lock 104 may determine a status information of the lock 104 based on the opening or closing the lock 104. The lock 104 may be in an open status when the lock 104 is not latched/connected with the door of the room 102. Also, the lock 104 may be in a close status when the lock 104 is latched/connected with the door of the room 102.

The lock 104 may also determine if the user 106 is entering or leaving the room 102 based on the opening or closing of the lock 104. For an instance, when the lock 104 is opened using a front door handle by the user 106 then a latch mechanism in the lock 104 understands that user 106 is entering into room 102 and then, the user 106 is in room 102. When the lock 104 is accessed from inside the door of the room 102 by the user 106 then the latch mechanism understands that user 106 is leaving the room 102 and then, the user 106 is not inside the room 102. Further, the lock 104 may generate audit/s periodically or on occurrence of an event. Such audit/s may include the status information of the lock 104, information related to the user 106 entering or leaving the room 102, a room number and/or a room type information. The room type information may be information related to a type of the room 102. For an instance, the room 102 may be a presidential suite, a luxury suite, a deluxe suite, or a standard room.

Once the lock 104 generates the audit/s for the room 102, the lock 104 may transmit the audit/s to the server 110 through the network 108A. The server 110 may determine if the user 106 of the room 102 has opted for a user privacy service. In an embodiment, the information related to the user privacy service may be available to the server 110 at the time of booking of the room 102 by the user 106. In a different embodiment, the information related to the user privacy service may be available to the server 110 at the time of check-in in the room 102 by the user 106. In yet another embodiment, the information related to the user privacy service may be available to the server 110 at any time during the stay of the user 106 in the room 102.

After the server 110 determines that the user 106 of the room 102 has opted for the user privacy service, the server 110 may analyze the audit/s received from the lock 104 of the room 102. Alternatively, if the server 110 determines that the user 106 of the room 102 has not opted for the user privacy service, the server 110 does not analyze the audit/s received from the lock 104 of the room 102.

The server 110 may analyze the audit/s received from the lock 104 to determine an availability of the user 106 in the room 102. In an embodiment, the server 110 may analyze the audit/s by applying a machine learning technique to the audit/s. Further, the machine learning technique may examine the audit/s received from the lock 104. Moreover, the machine learning technique in the server 110 may draw plots based on the audit/s received from the lock 104 and may analyze time/s when the user 106 is leaving and entering the room 102 with time durations. Then, the machine learning technique may generate a report indicating a likelihood of unavailability (or a time of unavailability) of the user 106 in a day at the room 102 and may identify a best service time for providing the service to the room 102. Furthermore, the machine learning technique may also consider a stay period information of the user 106 in the room 102 and a stay history of the user 106 to determine the availability of the user 106 in the room 102.

When the server 110 determines the availability of the user 106 in the room 102, the server 110 may determine a service time for providing a service to the room 102 based on the availability of the user 106 in the room 102. This has been explained in details below with an example.

Once the server 110 determines the service time for providing the service to the room 102, the server 110 may transmit a notification or a message to the electronic device 112 of the service provider 114 through the network 108B. Such notification may include the determined service time for providing the service to the room 102, the room number of the room 102. In addition, the server 110 may transmit credentials to the electronic device 112 of the service provider 114 through the network 108B for accessing the room 102. Then, when the service provider 114 receives the notification from the server 110, the service provider 114 may provide the service to the room 102 according to the notified service time. Also, the service is provided in the room 102 if the user 106 is not available in the room 102. Moreover, in case, if the user 106 of the room 102 has not opted for the user privacy service, then the service is provided in the room 104 at a regular service time or pre-scheduled service time.

Considering an exemplary Table 1 showing lock audit/s associated with the lock of the room.

TABLE 1

| Room Number | Room Type | Lock Status | Time Stamp | Room Leaving/Entering |
|---|---|---|---|---|
| 102 | Presidential Suite | Open | 09:30 AM | Leaving |
| 102 | Presidential Suite | Close | 10:30 AM | Entering |
| 102 | Presidential Suite | Open | 11:00 AM | Leaving |
| 102 | Presidential Suite | Close | 07:30 PM | Entering |
| 102 | Presidential Suite | Open | 09:30 PM | Leaving |
| 102 | Presidential Suite | Close | 10:30 PM | Entering |

As can be seen in exemplary Table 1 above, the lock 104 of the room 102 gets opened at 09:30 AM, 11:00 AM, and 09:30 PM when the user 106 is leaving the room 102. And, the lock 104 of the room 102 gets closed at 10:30 AM, 07:30 PM and 10:30 PM when the user 106 is entering the room 102. When the server 110 receives the audit/s as seen in Table 1, the server 110 may apply the machine learning technique and may determine that the user 106 is leaving the room at 11:00 AM and entering at 07:30 PM and the user 106 is not available in the room during this time period. Accordingly, the server 110 may determine 11:30 AM to 05:00 PM as the service time to provide a service to the room 102.

The present invention encompasses the server 110 to apply the machine learning technique to the audit/s when a predetermined number of audit/s are available for analysis. The predetermined number of audit/s may be configured by the server 110 or may be configured by an owner of a hotel. In other words, the server 110 may determine the service time only when the audit/s data is sufficient to analyze and then, predict the service time. For an example, based on a condition of a duration of the user 106 staying in the room 102 (say, n days) and the number of audit/s reaches to a particular defined strength (say, 10 lock operations), then the machine learning technique may analyze the audit/s and may generate the report as discussed above.

The present invention encompasses the server 110 to consider scheduled breakfast time and dinner time of the hotel to determine the service time and consider that the user 106 is not available in the room 102 during the breakfast and dinner times. Such presumption or consideration is valid only when the user 106 has opted for restaurant services.

The present invention also encompasses the server 110 to determine the service time based on privileges provided to the user 106. For an instance, the service time is determined only for the user of the presidential suite or the luxury suite. Also, the service time is not determined by the server 110 for the user of the deluxe suite or the standard suite. Further, the user of the deluxe suite or the standard suite may opt for the automated service time feature at an additional cost.

The present invention further facilitates to provide an automatic dashboard information to the user 106, wherein the automatic dashboard information is accessed by the user 106 through an application which indicates the determined service time so that the user 106 can know about the service time during which the service will be provided by the service provider in the room 102.

Figure 2:
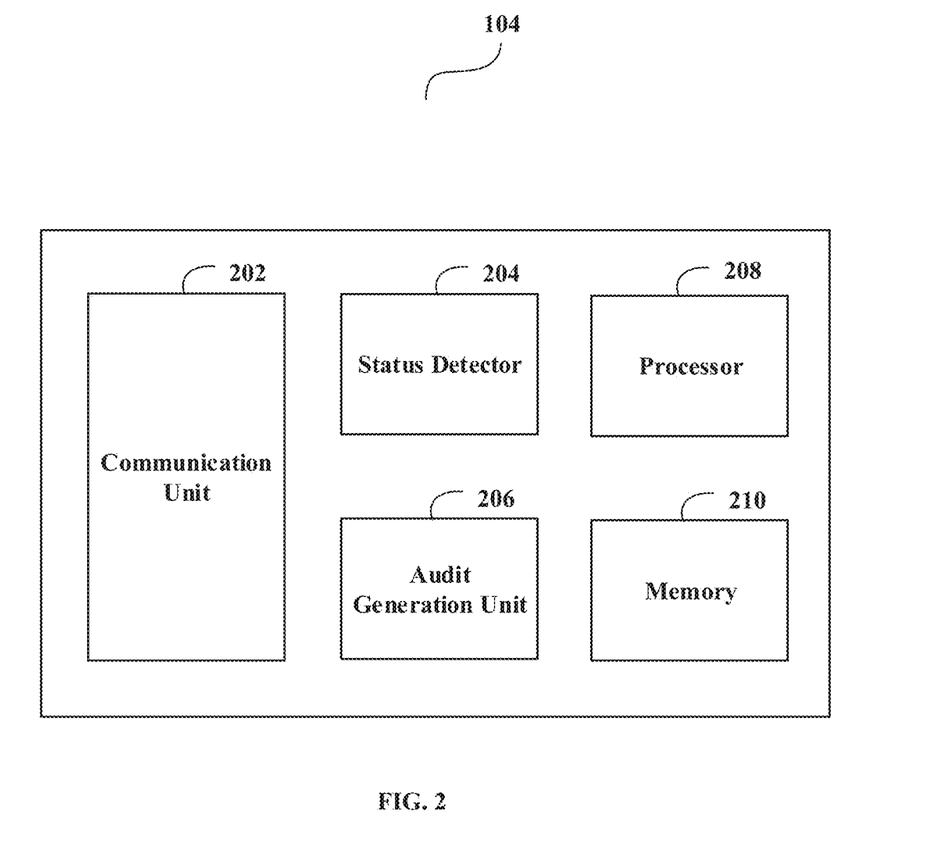
FIG. 2 depicts block diagram of different components in a lock according to an exemplary embodiment of the invention.

FIG. 2 depicts block diagram of different components in a lock 104 according to an exemplary embodiment of the invention. The lock 104 may comprise, but is not limited to, a communication unit 202, a status detector 204, an audit generation unit 206, a processor 208 and a memory 210. The status detector 204 may be adapted to detect a status information of the lock 104. The status information of the lock 104 may be opened or closed as explained above. The audit generation unit 206 may generate the audit/s based on the status information of the lock 104 received from the status detector 204. The communication unit 202 may be adapted to communicate with the server 110 through the network 108A for transmitting the audit/s of the lock 104. The processor 208 may control the processing of the communication unit 202, the status detector 204 and/or the audit generation unit 206. The processor 208 resided in the lock 104 may be associated with the memory 210 for storing and fetching instructions in relation to the normal functioning of the lock 104. The memory 210 may store a number of the lock 104, a number of the room 102 and/or a room type information. Also, the communication unit 202, the status detector 204, the audit generation unit 206 and/or the memory 210 may be communicably coupled with the processor 208.

Figure 3:
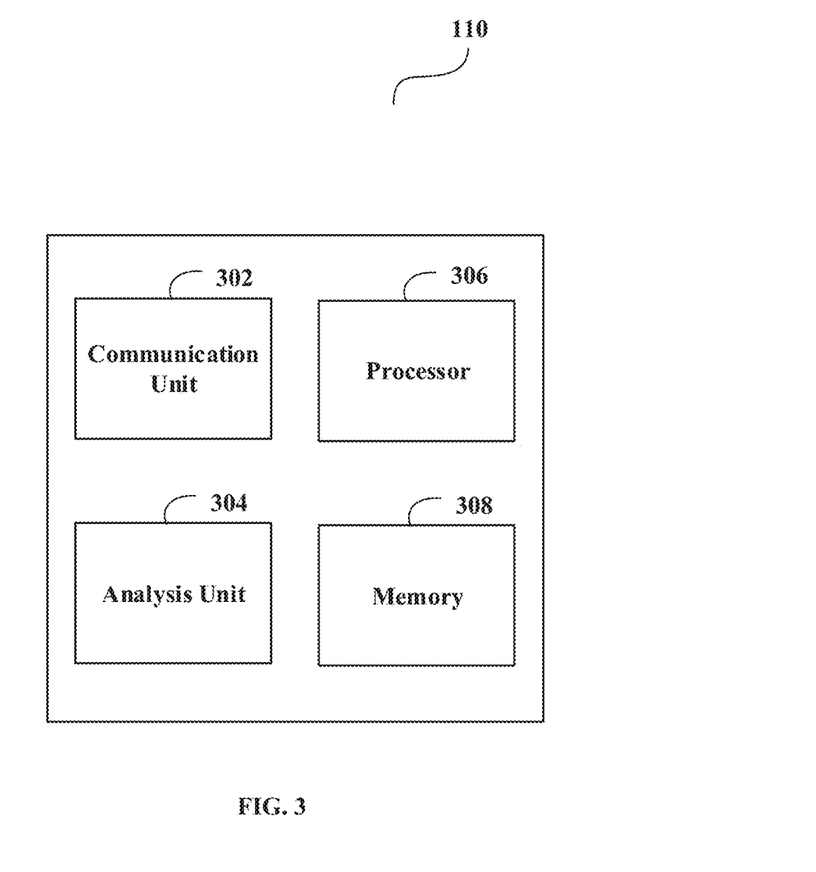
FIG. 3 depicts block diagram of different components in a server according to an exemplary embodiment of the invention.

FIG. 3 depicts block diagram of different components in a server 110 according to an exemplary embodiment of the invention. The server 110 may comprise, but is not limited to, a communication unit 302, an analysis unit 304, a processor 306 and a memory 308. The communication unit 302 may be in communication with the lock 110 through the network 108A and with the electronic device 112 of the service provider 114 through the network 108B. The processor 306 may be adapted to determine if the user 106 of the room 102 has opted for a user privacy service. The analysis unit 304 may be adapted to analyze the audits if the user 106 has opted for the user privacy service. The analysis unit 304 may also be adapted to determine an availability of the user 106 in the room 102 based on the analysis of the audits. The analysis unit 304 may further be adapted to determine a service time for providing a service to the room 102 based on the availability time of the user 106 in the room 102. The processor 306 may control the processing of the communication unit 302 and the analysis unit 304. The processor 306 may be associated with the memory 308 for storing and fetching instructions in relation to the normal functioning of the server 110. The communication unit 302 of the server 110 may transmit credentials to the service provider 114 for accessing the room 102 after determining the service time to service the room 102. The analysis unit 304 of the server 110 may apply the machine learning technique to the audit/s when the predetermined number of audit/s are available for analysis. Also, the communication unit 302, the analysis unit 304 and/or the memory 308 may be communicably coupled with the processor 306.

Figure 4:
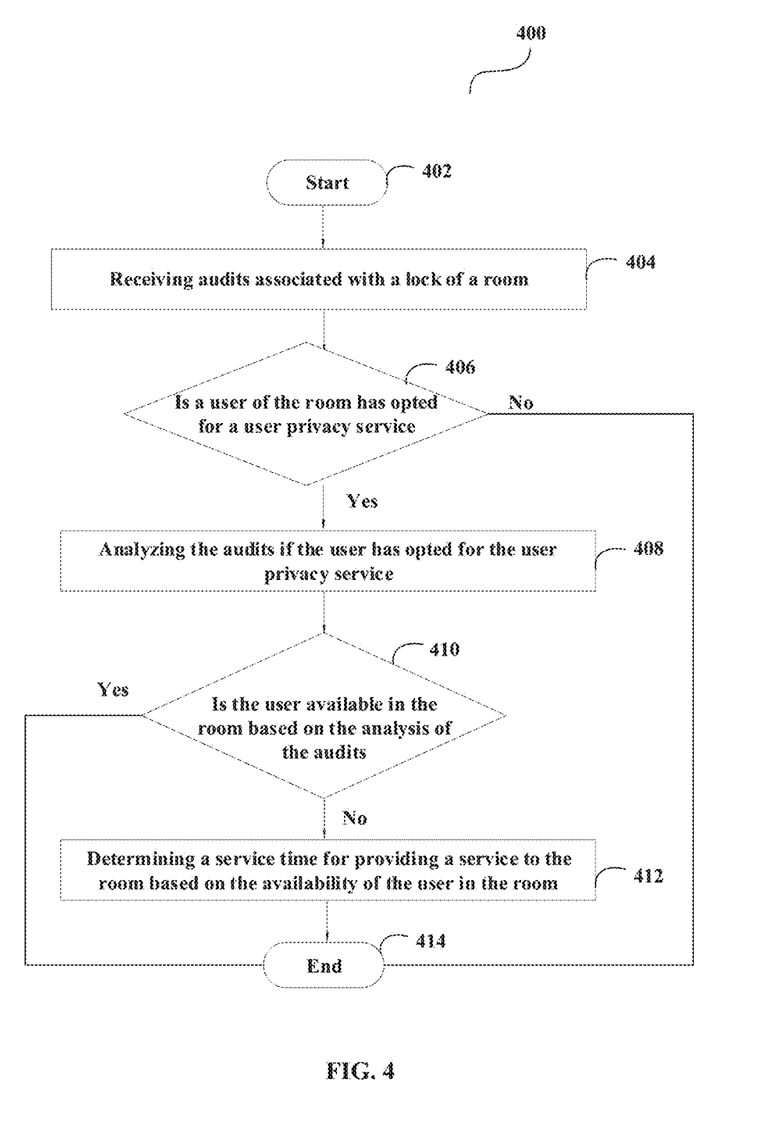
FIG. 4 depicts an exemplary flowchart illustrating a method to perform the invention according to an exemplary embodiment of the invention.

FIG. 4 depicts a flowchart outlining the features of the invention in an exemplary embodiment of the invention. The method flowchart 400 describes a method being performed for determining a service time for providing a service to the room 102 based on the availability of the user 106 in the room 102. The method flowchart 400 starts at step 402.

At step 404, the server 110 may receive the audits associated with a lock 104 of a room 102. The audits may represent data associated with entering and leaving the room by the user 106, a room type information or a status information of the lock 104.

At step 406, the server 110 may determine if the user 106 of the room 102 has opted for a user privacy service as described above. If the user 106 has opted for the user privacy service, then method 400 may proceed to step 408, otherwise, the method 400 ends at step 414.

At step 408, the server 110 starts analyzing the audits after determination whether the user 106 has opted for the user privacy service or not. The analysis of audits may be performed by applying the machine learning technique to the audits.

At step 410, the server 110 determines an availability of the user 106 in the room 102 based on analysis of the audits. If the server 110 determines that the user 106 is available in the room 102 then, the method 400 ends at step 414 and if the server 110 determines that the user 106 is not available in the room 102, then the method 400 may proceed to step 412.

At step 412, the server 110 determine a service time for providing a service to the room 102 based on the availability of the user 106 in the room 102 as discussed in FIG. 1 above. The method flowchart may end at 414.

The present invention facilitates the server 110 to determine a service time for providing a service in a restaurant or in a swimming pool or any other facility in a premises, wherein the service time is calculated based on one or more user's unavailability at the restaurant or the swimming pool or any other facility.

The present invention also facilitates the server 110 to determine a time or a day for which the user 106 may book the room 102 based on the analysis of the audit/s or based on the stay history of the user in the room 102. For an instance, the server 110 may determine that the user 106 books the room 106 of a hotel in month of October every year. The server 110 may use such stay history of the user 106 to determine the time for which the user 106 may book the room 102.

The present invention may also facilitate the server 110 to determine a service time for providing service to a hostel room or a classroom based on an availability of a student in the hostel of any university or college. For an instance, the server 110 may use classes' schedule, time-period of meals, or a time for which the student stays in the hostel or class based on attendance.

The present invention in addition, may also facilitate the server 110 to determine the time of availability or absence of a home owner. The server 110 may also transmit availability data of the home owner to the agent for scheduling agent-owner meeting in accordance with the availability of the owner. For instance, the server 110 may determine the availability of the owner according to the invention and this determined information is transmitted to the agent's electronic device 112 and make agent aware of absence or presence of the owner. This can also be applied to the agent-buyer relationship as well.

The present invention is applicable to various industries/fields such as, but is not limited to, hospitality industry, real estate, hostels, commercial universities, room management services, logistics services, a private/public space service management, merchant outlets service management systems and any such field that is obvious to a person skilled in the art.

The present invention provides the following technical advantages over the existing methods and systems: a) automatically determines a service time for providing service to the room, b) provides a user privacy service to the user by providing the services in the room when the user is not available in the room, c) creates good impression on the user of the room, and d) automatically determines availability of the user in the room based on analysis of the audit/s.

The embodiments of the invention and the tables discussed herein are exemplary and various modification and alterations to a person skilled in the art are within the scope of the invention.

In one embodiment of the invention, the invention can be operated using the one or more computer readable devices. The one or more computer readable devices can be associated with the server 110. A computer readable medium comprising one or more processors and a memory coupled to the one or more processors, the memory storing instructions executed by the one or more processors, the one or more processors configured to receive associated with a lock 104 of a room 102 and is also configured to determine if a user 106 of the room 102 has opted for a user privacy service or not. The memory storing instructions which are executed by the one or more processors, the one or more processors configured to analyze the audits if the user 106 has opted for the user privacy service and determining an availability of the user 106 in the room 102 based on the analysis of the audits. Accordingly, a service time is determined for providing a service to the room 102 based on the availability of the user 106 in the room 102.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Furthermore, the terms "user," "subscriber," "customer," "consumer," "agent," and the like are employed interchangeably throughout the subject specification, unless context warrants particular distinction(s) among the terms. Such terms can refer to human entities or automated components supported through artificial intelligence (e.g., a capacity to make inference based on complex mathematical formalisms) which can provide simulated vision, sound recognition and so forth.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   at a lock of a room, generating audits and communicating the audits to a server, wherein the audits comprise digital data generated by the lock, the digital data representing events associated with entering the room and leaving the room and a status information of the lock, the status information of the lock including opening of the lock and closing of the lock, wherein the audits further comprise a room type information;
   at a server:
     receiving the audits associated with the lock of the room;
     determining if a user of the room has opted for a user privacy service;
     analyzing the audits if the user has opted for the user privacy service, wherein the analysis of the audits is performed by applying a machine learning technique to the audits;
     determining an availability of the user in the room based on the machine learning analysis of the audits;
     determining a service time for providing a service to the room based on the availability of the user in the room only if the room type information includes a predetermined room type;
     transmitting service provider credentials for accessing the room to a service provider other than the user after determining the service time to service the room; and, next,
   at the lock of the room, receiving the service provider credentials at the service time and allowing the service provider to access the room by automatically opening the lock in response to receipt of the service provider credentials.

2. The method of claim 1, wherein the machine learning technique examines the audits, a stay period information of the user and/or a stay history of the user to determine the service time for providing the service to the room.

3. The method of claim 1, wherein the machine learning technique is applied to the audits when a predetermined number of audits are available for analysis.

4. The method of claim 1, wherein the service is provided to the room if the user is not available in the room.

5. The method of claim 1, wherein the service time is notified to a service provider for providing the service to the room based on the machine learning analysis of the digital data.

6. The method of claim 1, wherein the service time is determined based on privileges provided to the user.

7. The method of claim 1, wherein the service is provided to the room at a regular service time if the user of the room has not opted for the user privacy service.

8. The method of claim 1, wherein the service time is a scheduled time at which room cleaning is performed.

9. A system comprising:
   a lock associated with a room comprising:
     an audit generator unit adapted to generate audits, wherein the audits comprise digital data generated by the lock, the digital data representing events associated with entering the room and leaving the room and a status information of the lock, the status information of the lock including opening of the lock and closing of the lock, wherein the audits further comprise a room type information;
     a communication module adapted to transmit the audits to a server; and
   a server comprising:
     a communication unit adapted to receive the audits from the lock;
     a processor adapted to determine if a user of the room has opted for a user privacy service;
     an analysis unit adapted to:
       analyze the audits if the user has opted for the user privacy service, wherein the analysis is performed using a machine learning technique;
       determine an availability of the user in the room based on the analysis of the audits; and
       determine a service time for providing a service to the room based on the availability of the user in the room only if the room type information includes a predetermined room type;
     wherein the server uses the communication unit to transmits service provider credentials for accessing the room to a service provider other than the user after determining the service time to service the room; and
   the lock is further configured to receive the service provider credentials at the service time and allow the service provider to access the room by automatically opening the lock in response to receipt of the service provider credentials.

10. The system of claim 9, wherein the machine learning technique examines the audits, a stay period information of the user and/or a stay history of the user to determine the service time for providing the service to the room.

11. The system of claim 9, wherein the service is provided to the room at a regular service time if the user of the room has not opted for the user privacy service.

12. The system of claim 9, wherein the service time is notified to a service provider for providing the service to the room based on the analysis.

13. The system of claim 9, wherein the service time is determined based on privileges provided to the user.

14. The system of claim 9, wherein the server applies the machine learning technique to the audits when a predetermined number of audits are available for analysis.

15. The system of claim 9, wherein the service time is a scheduled time at which room cleaning is performed.

16. A non-transitory computer readable medium comprising a memory, the memory storing instructions which are executed by one or more processors to implement the method of claim 1.

* * * * *